March 12, 1940.  C. B. DALZELL  2,192,962
REMOVABLE SANITARY PIPE COUPLING
Filed April 12, 1939
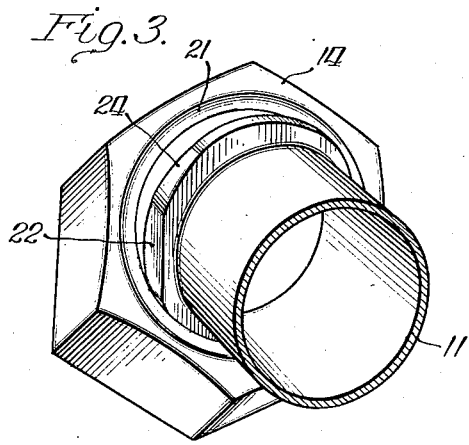
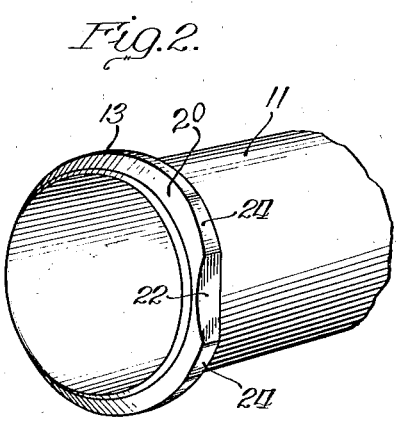
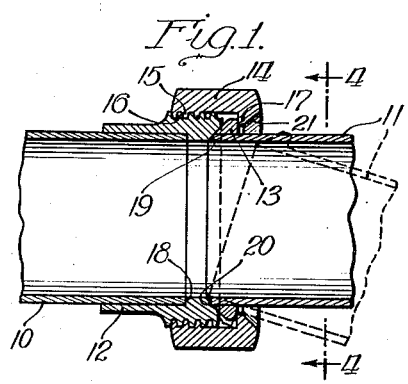
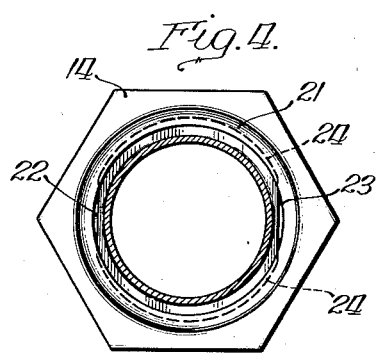
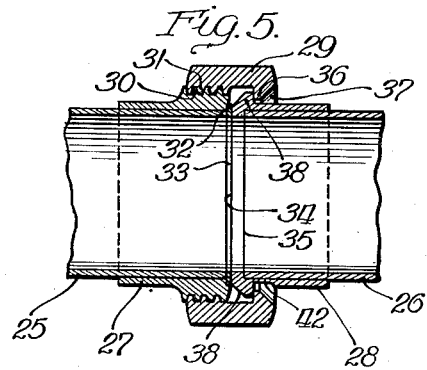
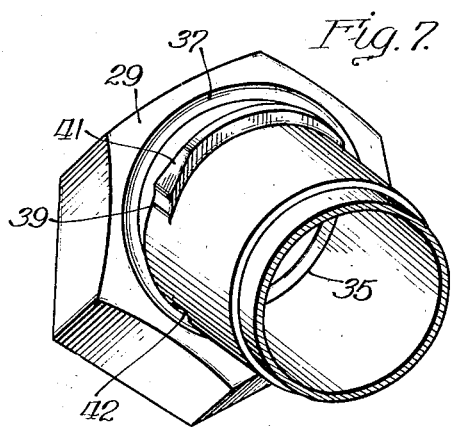
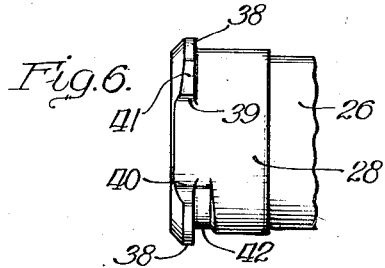
INVENTOR.
Charles B. Dalzell
BY Norman E. H. Peletzke
ATTORNEY.

Patented Mar. 12, 1940

2,192,962

UNITED STATES PATENT OFFICE 2,192,962

REMOVABLE SANITARY PIPE COUPLING

Charles B. Dalzell, Little Falls, N. Y., assignor to Cherry-Burrell Corporation, Chicago, Ill.

Application April 12, 1939, Serial No. 267,359

6 Claims. (Cl. 285—122)

This invention relates to new and useful improvements in removable sanitary pipe couplings for separably joining the ends of pipe sections in a readily disconnectible manner.

The sanitary processing of foodstuffs, particularly milk, usually involves a series of separate operations necessitating the passing of the materials from one processing operation to the next. To enable the sanitary passage of materials during such processing operations it is the general practice to employ what is commonly known as sanitary piping, fittings and couplings. In compliance with prevailing public health regulations it is common practice, upon the completion of a processing operation, to dismantle the apparatus used, including the pipe connections, fittings and couplings, so that all elements may be readily cleaned after which the various pieces of apparatus and connecting pipes may be reassembled for subsequent use.

In the past the couplings for use with sanitary piping, which have been satisfactorily constructed from a mechanical standpoint to enable them to withstand substantial strains to which they are subjected during use, have not been so constructed that they could be completely dissociated from the remaining parts of the piping system to enable the satisfactory cleaning before reassembling.

The prime object of this invention is to provide a sanitary coupling for separable pipe sections, including a removable screw coupling or nut which, when uncoupled, permits the complete dissociation of the coupling nut from the remaining elements of the fitting and pipe sections for thorough cleansing and sterilization before reassembling.

The foregoing objects and others which will become apparent as the nature of the invention is better understood I prefer to accomplish as illustrated in the preferred embodiment of my invention in a sanitary pipe coupling which I provide with a plurality of improved and novel features involving the combination and arrangement of parts hereinafter more fully described. The organization and method of operation will be best understood from the following description of the specific embodiments when read in connection with the accompanying drawing in which:

Figure 1 is a longitudinal section taken through an assembled coupling of the preferred embodiment of my invention, as shown perspectively in partially assembled condition in Figure 3.

Figure 2 is a perspective view of the male element of the coupling embodied in the preferred construction.

Figure 3 is a perspective view of the male and female elements of the coupling showing the preferred embodiment of my invention in a partially assembled condition.

Figure 4 is a cross sectional view taken along the line 4—4 of Figure 1, showing the centering of the coupling nut about the sealing and compression flanges on the ends of the pipe sections and the substantial overlapping of these elements to impart strength to the coupling.

Figure 5 is a longitudinal section similar to Figure 1 taken through a modified embodiment of my invention shown perspectively in partially assembled condition in Figure 7.

Figure 6 is a side elevation of the male element of the modified embodiment of my invention.

Figure 7 is a perspective view of the modified embodiment of my invention similar to Figure 1.

Referring to Figures 1 to 4 inclusive, which illustrate the preferred embodiment of my invention, 10 and 11 represent the adjacent ends of the two pipe sections which are to be joined or coupled together The removable coupling comprises a tubular element 12 and an annular flange element 13, each permanently fixed to one of the adjacent ends of the pipe sections 10 and 11, respectively, as by brazing or any other satisfactory means, as shown in Figure 1, and a screw coupling sleeve or compression member 14 provided with internal screw threads 15 at one end to engage complementary threads 16 on the outer periphery of the element 12 and provided at its other end with an inwardly directed annular flange or retaining means 17 having an inwardly beveled face 21 at its outer edge and adapted to overlap and engage the rear face of the annular flange or collar 13. By this construction the coupling elements 12 and 13 and the ends of the associated pipe sections 10 and 11 may be drawn forcibly together by tightening the screw coupling or compression element 14.

The tubular element 12 is provided adjacent its free end with an inwardly extending shoulder 18 arranged to abut against the end of the pipe section 10 when the tubular element 12 is telescoped over and fixed to the end thereof. An internally beveled joint-forming face 19 constituting the female element of the coupling is provided at the free end of the element 12 and is adapted to seat against a complementary outwardly beveled face 20 formed on the free end of the pipe section 11 and the adjacent face of the flange 13 constituting the male element of the pipe coupling. The inclination of the beveled faces 19 and 20 may be of any satisfactory angle. In practice it has been found that an inclination of 45 degrees proves very satisfactory in adapting the complementary beveled faces to produce a liquid-tight, metal-to-metal joint upon the tightening of the screw coupling 14.

In the former types of pipe section couplings provided with unitary screw coupling elements comparable to element 14 of my invention and having a strong inwardly directed flange comparable to flange 17 of my invention, it has been impossible to remove the screw coupling from the pipe section once the retaining flange was fixed to the pipe. Such a construction is, of course, undesirable in that the nut cannot be removed for cleaning. In the type of pipe coupling formerly available, in which the screw coupling element could be removed for cleaning, the screw coupling element usually comprised the use of split members or slotted flanges, which constructions unnecessarily increased the number of component parts comprising the coupling or substantially weakened it.

My invention is primarily directed to a pipe coupling using a strong unitary screw coupling element engaging one coupling member by a conventional flange and the other coupling member by a screw thread. In this construction the coupling element may be entirely removed over one coupling member engaged by the flange by slightly tilting the screw coupling nut after unscrewing the coupling element from the other member.

To enable the removal of the coupling nut 14 from the pipe section 11 over the flange 13 and to so employ flange 13 that, when centered in the coupling nut 14, it will engage the flange 17 throughout a substantial part of its circumference, I provide on flange 13 two diametrically opposed flat faces 22 and 23. The flat faces 22 and 23 are spaced one from another a lesser distance than the outer diameter of the flange 13 and are gradually blended into the outer periphery of the flange 13 by curved faces 24 at either end of the faces 22 and 23, which curved faces are also in pairs and are also diametrically opposed and of a lesser distance apart than the outer diameter of flange 13.

Assuming the several elements which constitute the coupling to be in dismantled order, the elements 12 and 13 being fixed to the ends of the pipe sections 10 and 11, and it is desired to assemble the coupling and seal the pipe sections together, the screw coupling element 14 is partially telescoped and tilted over the collar 13, as shown perspectively in Figure 3 and in section by the dotted line of Figure 1. In this position the lower portion of the flange 13 extending into the coupling nut 14 is permitted to extend downwardly behind the flange 17 due to the clearance afforded by the flat faces 22 and 23 on the sides of the flange 13 until the outer periphery of flange 13 contacts the inner periphery of the nut 14 or until the outer periphery of the pipe unit 11 contacts the inner periphery of the flange or detent 17.

The internal diameters of the nut 14 and the flange 17 and the outer diameters of the flange 13 and the pipe section 11, as well as the spacing of the flat faces 22 and 23, are all in proportion to the size of the pipe section and coupling and, when these proportions are comparable to those illustrated in the drawing and the above indicated condition is achieved, then the nut 14 may be tilted further to completely encompass the flange 13 and pipe 11. The pipe 10 and its associated element 12 are then brought into juxtaposition and alinement with the pipe 11 and, upon the tightening of the screw coupling 14 upon the element 12, the male and female elements 19 and 20 will be brought into registry and sealing relation, as shown by Figures 1 and 4, and the coupling nut 14 will be centered about the flange 13 with flanges 13 and 17 in compressive engagement.

In view of the above explanation and the figures discussed it will be quite obvious that the outer diameter of the flange 13 is larger than the inner diameter of the flange or detent means 17. Yet, due to the configuration of the sides 22 and 23 of the flange 13 and the relative proportion of all of the elements of the coupling, it is possible to remove the flange nut 14 over the flange 13 to enable the cleaning of the various elements which constitute the pipe coupling. It should, of course, be quite evident that a slightly further modified flange 13, viz., having curved faces instead of flat faces 22 and 23, whereby the contour of the outer periphery of the flange 13 will be or approach the nature of an ellipse, would also work satisfactorily in the manner and in the combination described.

In Figures 5, 6 and 7 I have shown a second embodiment of my invention in which the pipe sections 25 and 26 to be joined are provided at their respective ends with tubular coupling members 27 and 28 which are drawn together by a screw coupling element 29. The coupling member 27 is provided with screw threads 30 on its outer periphery to engage complementary screw threads 31 on the adjacent part of the inner periphery of the element 29, and is provided with a recessed gasket seat 32 to carry a gasket 33 to engage a complementary flat sealing face 34 provided at the adjacent end of the coupling member 28.

In the coupling member 27 the pipe section 25 is telescoped thereinto until the leading edge of the pipe section is flush with the gasket seat 32. In the coupling member 28, however, the pipe section 26 is telescoped thereinto until it engages an inwardly directed shoulder 35 adjacent the sealing end of the coupling member 28. The coupling members 27 and 28 are fixed to the pipe sections 25 and 26 by any satisfactory means such, for example, as brazing or soldering.

In the modified embodiment of my invention shown in Figures 5, 6 and 7, the screw coupling or nut 29 may be identical in all respects with the screw coupling or nut 14 of my preferred embodiment and is also provided at one end with an inwardly directed retaining flange 36 having an internally beveled outer face 37. The flange 36 on the screw coupling or compression nut 29 engages an outwardly extending flange 38 provided at the free end of the coupling member 28 which in turn is provided with an outwardly beveled face 39.

In the preferred embodiment of my invention the flange 13 is mounted directly on the pipe section 11 while in the modified embodiment of my invention, illustrated in Figures 5, 6 and 7, the comparable retaining flange 38 is mounted on a tubular coupling member 28 which in turn is mounted on pipe section 26.

The flange 38, as shown in Figure 6, is in actuality a segmental flange consisting of two diametrically opposed segments with spaces intermediate their adjacent ends 39 and 40 to provide the equivalent of the flat faces 22 and 23 of my preferred embodiment, as shown in Figure 4. The upper segmental portion of the modified embodiment, as shown in Figure 6, is also provided with gradually tapered end portions 41 comparable to the tapered portions 24 of the flange 13 of my preferred embodiment, as shown in Figure 4. Due to the fact that the tubular element 28 contstitutes a substantial increase in the outer diameter of the tubular section 26 as compared with the outer diameter of the tubular section 11 shown in Figure 1 of my preferred embodiment, it is necessary in the modified embodiment of my invention to provide a segmental groove 42 in the tubular element 28 immediately adjacent and symmetrically positioned with respect to the lower segmental section of flange 38.

Assuming that pipe sections 25 and 26 and the associated coupling elements are dismantled and it is desired to assemble the same into a sealed, coupled position, the same procedure should be followed as described with respect to the assembly of the preferred embodiment of my invention. It should, however, be noted that one essential difference exists and that is that in partially telescoping the coupling nut 29 over the flange 38, preparatory to completely telescoping the nut over the flange 38 and the associated pipe element 26, the inner edge of the flange 36 should extend into and register with the segmental groove 42. The coupling element 29 may then be tilted further to completely encompass the segmental flange element 38 and tubular element 28 whereupon the pipe section 25 with its associated coupling member 27 carrying the sealing gasket 33 may be brought into juxtaposition and alinement and the screw coupling 29 tightened to secure a sealed union. From Figure 5 it will be apparent that the centering of the coupling member 28 with its segmental flange elements 38 within the coupling nut 29 may be secured by the registration of the face 34 against the gasket 33 and extending into recess 32 in the coupling member 27, to the outside of which the coupling nut 29 is secured in spaced relation.

In the previous description the coupling nut 14, as well as the nut 29, have been referred to as being provided with screw threads 15 and 31, respectively. Similar constructions were described with respect to the coupling nut 29. Obviously some other coupling means, such as bayonet joints, clamps or other equivalent mechanism, may be satisfactorily used. The screw thread arrangement was illustrated for the reason that it is probably the most common construction in popular use. It should also be obvious that, though some of the figures, for the purpose of clear illustration, indicate the pipe sections, i. e., 11 and 26, are tilted with respect to the respective coupling nuts associated therewith when the uncoupling process takes place, this form of illustration, as stated, is merely for convenience and in actuality, of course, the nut is tilted instead of the pipe section and fitting with which it cooperates.

In the various figures the reduced diameter of the flange or collar on the pipe section which co-acts with the flanged coupling nut has been illustrated as consisting of a collar or flange having oppositely disposed flat faces or oppositely disposed interruptions on the flange. Obviously these were used primarily for the purpose of clear illustration only and it should be understood that, instead of oppositely disposed flat faces or oppositely disposed interrupted collars, equivalent constructions may be used. Such an equivalent construction might take the form of a collar whose outer contour is in the nature of or substantially approaches an ellipse. The essential feature in the illustrations shown or in any modified construction would be a collar on the coupling element fixed to the pipe in which the greatest diameter of the collar is greater than the internal diameter of the inwardly directed flange on the coupling nut but less than the internal diameter of the coupling nut proper and in which the smallest diameter of the collar on the coupling element is less than the internal diameter of the flange on the coupling nut, whereby the parts may be assembled or dismantled substantially as described.

It is, however, also obvious that a coupling mechanism employing the present invention may also be constructed in which the proportionate arrangement of diameters of the inwardly directed flange on the coupling nut and the outwardly directed collar on the one coupling element would be in the opposite order or arrangement to those illustrated in the figures previously referred to. Such an opposite arrangement may comprise a coupling mechanism in which the outwardly directed collar on the one coupling element would be of equal diameter throughout while the inwardly directed flange on the coupling nut would be of varying diameter throughout to substantially approach an ellipse with the greatest internal diameter of the said flange greater than the diameter of the collar and the smallest diameter of the flange smaller than the diameter of the collar. In this modified construction the greatest diameter of the elliptical flange is substantially at right angles to the smallest diameter thereof, whereby the same procedure may be followed in dismantling and assembling the coupling mechanism to enable the removal of the nut over the flange when uncoupled and yet apply compressive force to all elements thereof which are of equal diameter with any other elements thereof to which compressive force is applied thereby, when coupled, as well as to assure a substantial compression area as is also assured in the modifications illustrated by the figures.

My invention, therefore, provides a sanitary pipe coupling comprised of a minimum number of working parts in which the coupling nut and the cooperating flanges are so constructed as to provide for sufficient strength to enable satisfactory operation and in which the coupling nut may be easily and quickly removed from the pipe sections and the associated coupling members, as pointed out in the foregoing description.

Although I have shown and described certain specific embodiments of my invention I am fully aware of the many possible modifications thereof. My invention is, therefore, not to be restricted except in so far as necessary by the prior art and the spirit of the applied claims.

The invention is hereby claimed as follows:

1. A separable pipe coupling comprising, in combination, first and second coupling elements carried by adjacent ends of pipes adjusted to be coupled together, means on said coupling elements adapted to aline and maintain said elements alined when in coupled position, an outer peripheral flange on the first of said elements, and an internally flanged coupling sleeve removably carried by the second of said elements and adapted to overlap said outer peripheral flange when said elements are coupled together, the first one of said coupling element flanges being of varying diameter with the greatest and smallest diameters thereof being substantially at right angles to each other, whereby only some portions thereof will engage the other of said flanges when in coupled and alined position, said internal flange being adapted to engage said outer peripheral flange and apply compressive force to all elements thereof which are of equal diameter with any other elements thereof to which compressive force is applied thereby to maintain said elements coupled when said elements and said coupling sleeve are in coupled position.

2. In a device of the class described, first and second coupling elements adapted to be coupled together, a removable sleeve carried by the first coupling element, circularly apertured flange means carried by said sleeve and adapted to overlap the second coupling element, and means to aline said coupling elements and prevent relative lateral motion when said elements are in coupled position, the second coupling element comprising flange means having a portion thereof of lesser diameter than the remaining portion thereof and also of lesser diameter than the aperture of said apertured flange means.

3. In a pipe coupling for detachably joining the abutting ends of pipes in sealed and alined relation one to another, the combination of a first pipe, an externally threaded tubular element fixed to the end of said first pipe and having a beveled end face, an internally threaded sleeve adapted to be screwed onto said tubular element, inwardly directed circularly apertured flange means on said sleeve, a second pipe, and a compression collar fixed to the end of said second pipe and having a beveled face and adapted to be engaged on its opposite face by said inwardly directed flange means to force said beveled face into centering and sealing relation with respect to the beveled end face of said tubular element when said sleeve is threaded onto said tubular element, whereby relative lateral motion between said joined pipes is prevented, said compression collar being of substantially elliptical cross section with its greatest diameter larger than the internal diameter of said flange means but less than the internal diameter of said sleeve and its shortest diameter shorter than the internal diameter of said flange means, whereby upon unscrewing said sleeve from said tubular element said sleeve may be tilted with respect to said substantially elliptical collar and passed over said collar by moving the sleeve away from said collar with the plane of said flange means parallel to the shortest diameter of said elliptical collar and at an angle to the plane of said collar.

4. A separable pipe coupling comprising, in combination, first and second coupling elements carried by adjacent ends of pipes adjusted to be coupled together, means on said coupling elements adapted to aline said elements when in coupled position to prevent relative lateral motion between the ends of said pipes, an outer peripheral flange on the first of said elements, and an internally flanged coupling sleeve removably carried by the second of said elements and adapted to overlap said outer peripheral flange when said elements are coupled together, the one of said flanges being of varying diameter whereby only some portions thereof will engage the other of said flanges when in coupled position, said internal flange being adapted to engage said outer peripheral flange to maintain said elements coupled when said elements and said coupling sleeve are in coupled position.

5. A separable pipe coupling comprising, in combination, first and second coupling elements carried by adjacent ends of pipes adapted to be coupled together in axial alinement, said coupling elements having adjacent registrable beveled sealing faces, means on said coupling elements adapted to axially aline said elements when in coupled position and prevent relative lateral motion between said elements, an outer peripheral collar on the first of said elements, and an internally flanged coupling sleeve axially alined with and removably carried by the second of said elements and adapted to overlap said outer peripheral collar when said elements are coupled together, said peripheral collar being of a width equal to the distance intermediate the internal flange on the coupling sleeve and coupling element to which it is screwed when in coupled position, said internal flange being adapted to engage said outer peripheral collar and apply compressive force to all elements thereof which are of equal diameter to any other elements thereof to which compressive force is applied thereby to maintain said elements coupled when said elements and said coupling sleeve are in coupled position and one of said flanges being of varying diameter whereby only some portions thereof will engage the other flange when in coupled position.

6. In a device of the class described, first and second coupling elements adapted to be coupled together, a removable compression element carried by the first coupling element, overlapping retaining means carried by said compression element and adapted to overlap the second coupling element, and alining means to prevent relative lateral motion between said coupling elements when in coupled position, the second coupling element comprising cooperating retaining means having a portion thereof of lesser lateral dimension than the remaining portions thereof and also of lesser lateral dimension than the least lateral dimension between the overlapping portion of said overlapping retaining means.

CHARLES B. DALZELL.